Dec. 23, 1947.  A. J. TOWNSEND  2,433,308
LOCOMOTIVE TRUCK PIVOT MECHANISM
Filed Aug. 12, 1943   5 Sheets-Sheet 1
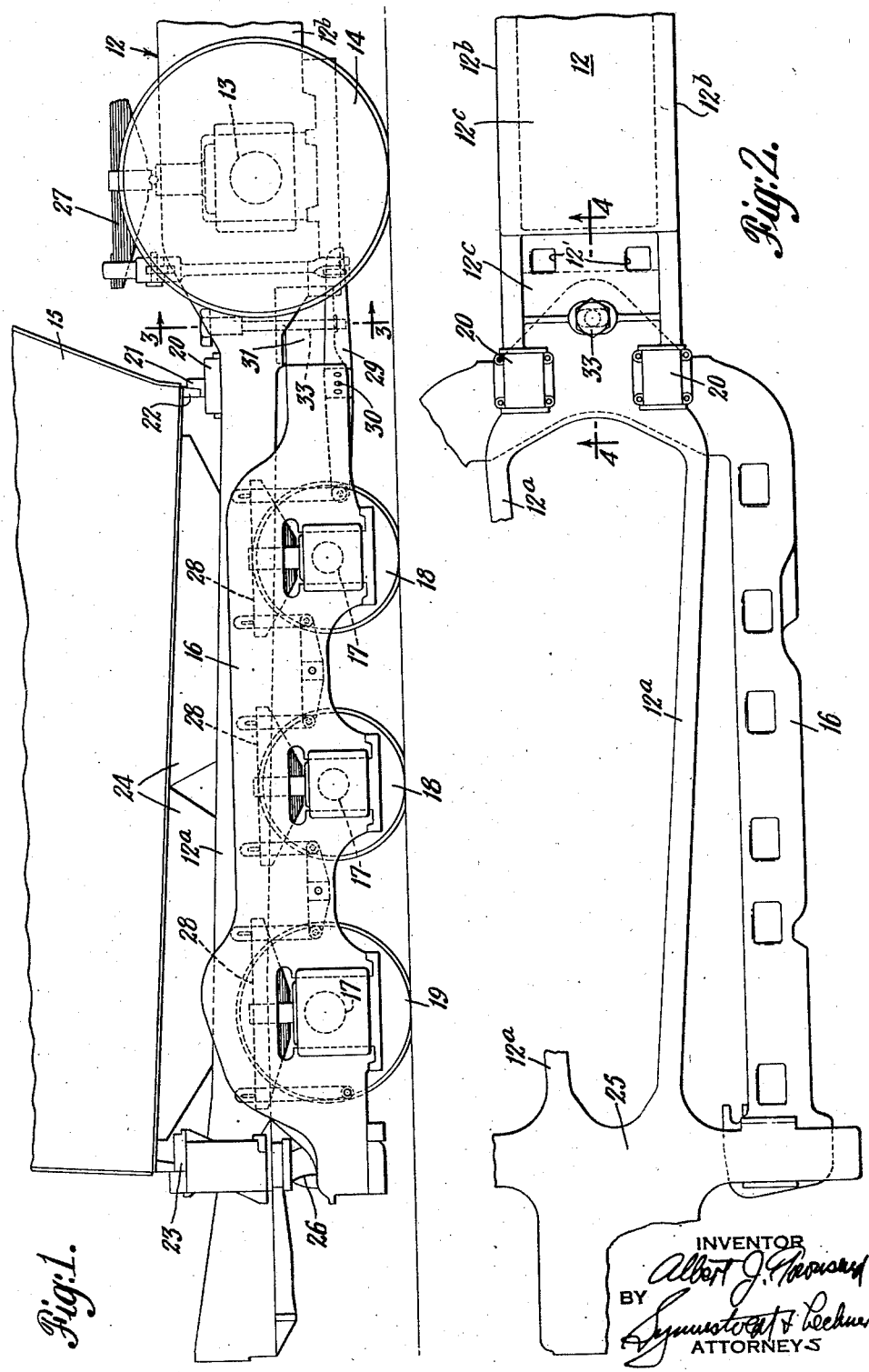

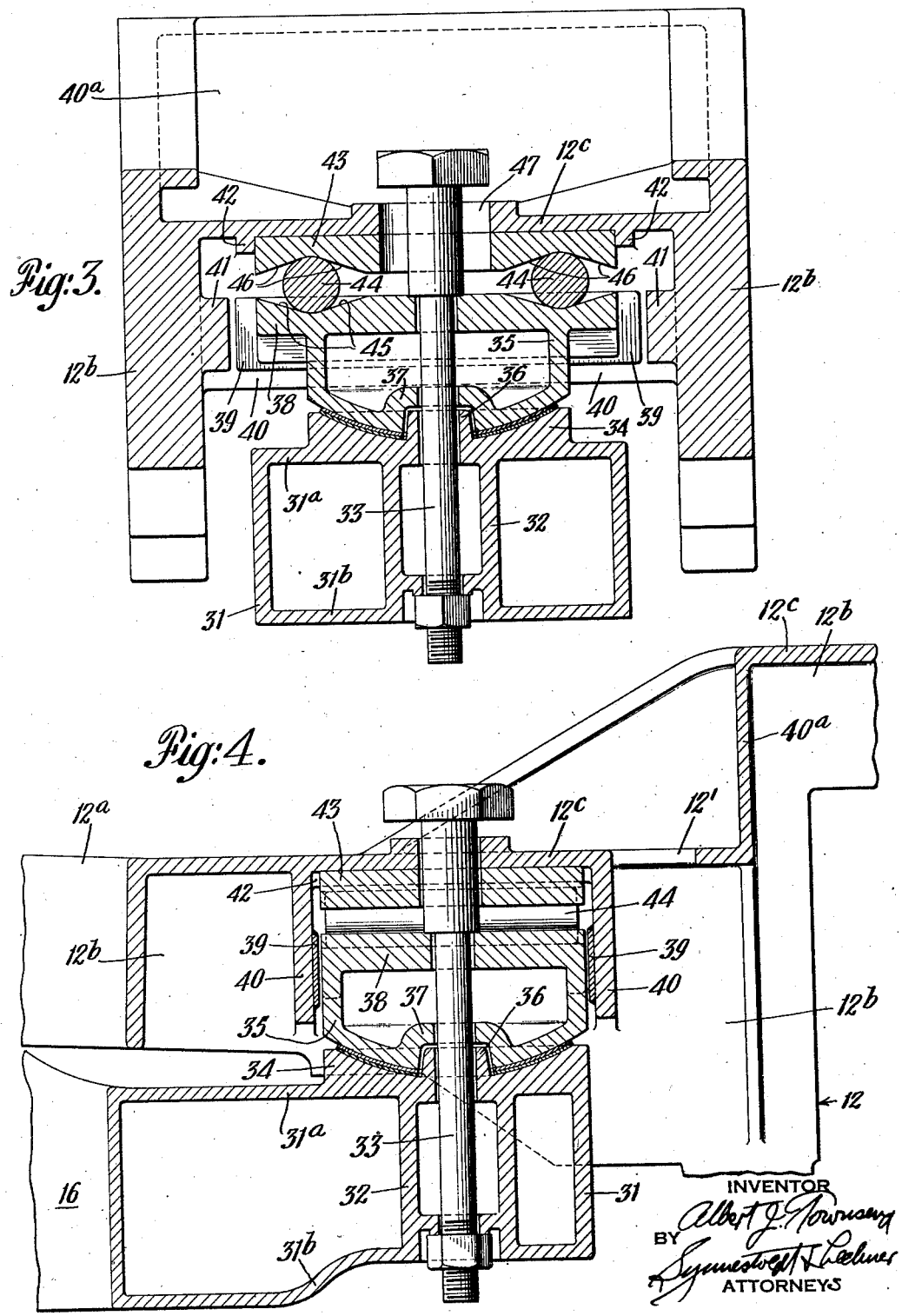

Dec. 23, 1947.    A. J. TOWNSEND    2,433,308
LOCOMOTIVE TRUCK PIVOT MECHANISM
Filed Aug. 12, 1943    5 Sheets-Sheet 3
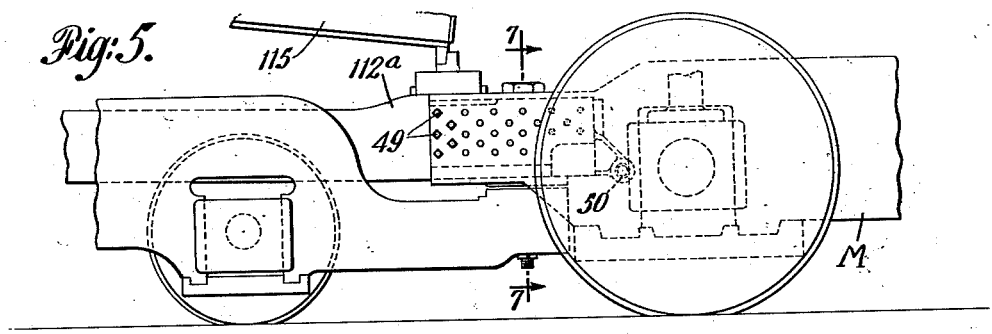
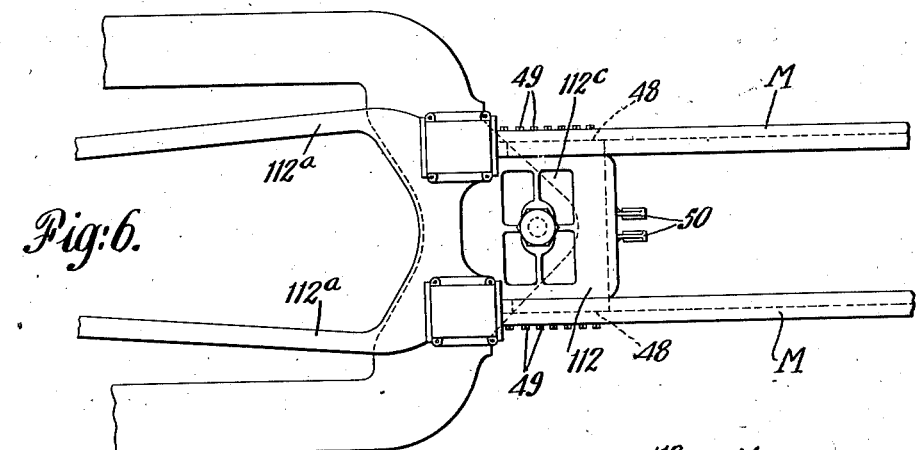
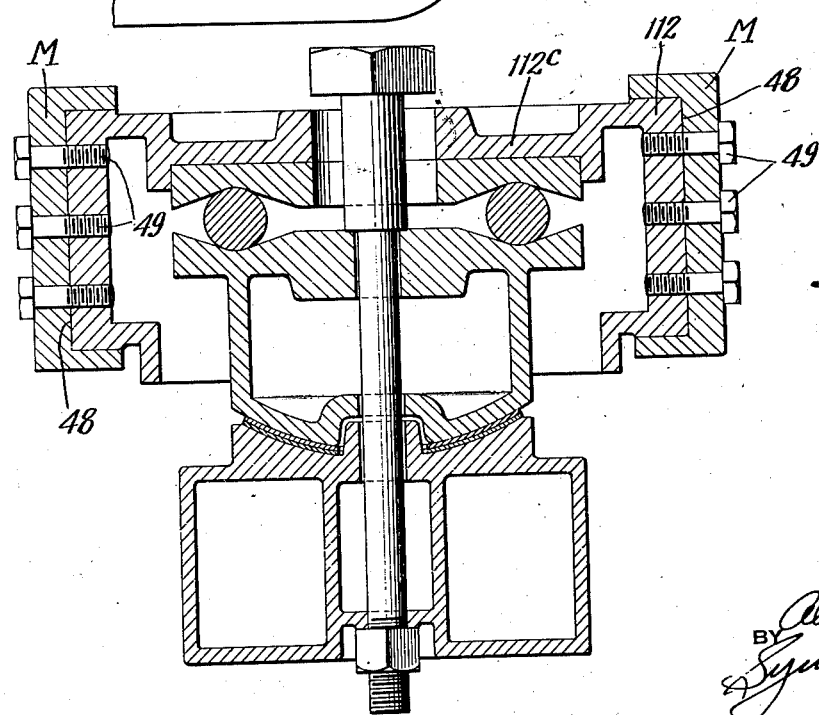
INVENTOR
Albert J. Townsend
BY
ATTORNEYS Dec. 23, 1947.   A. J. TOWNSEND   2,433,308
LOCOMOTIVE TRUCK PIVOT MECHANISM
Filed Aug. 12, 1943   5 Sheets-Sheet 4

INVENTOR
Albert J. Townsend
BY
ATTORNEYS

Dec. 23, 1947.  A. J. TOWNSEND  2,433,308
LOCOMOTIVE TRUCK PIVOT MECHANISM
Filed Aug. 12, 1943  5 Sheets-Sheet 5
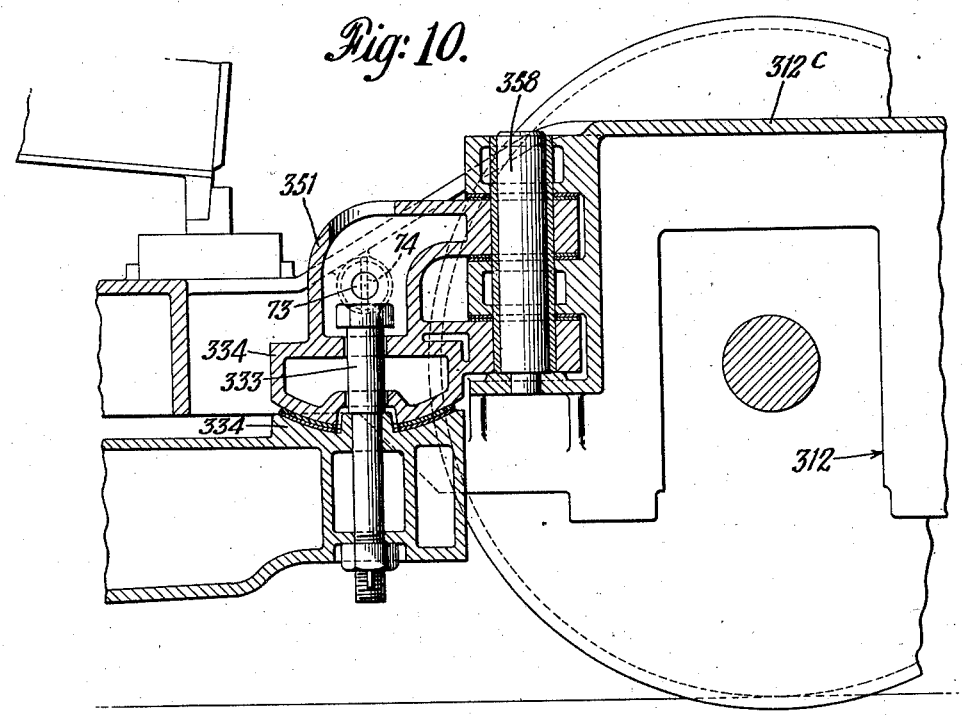
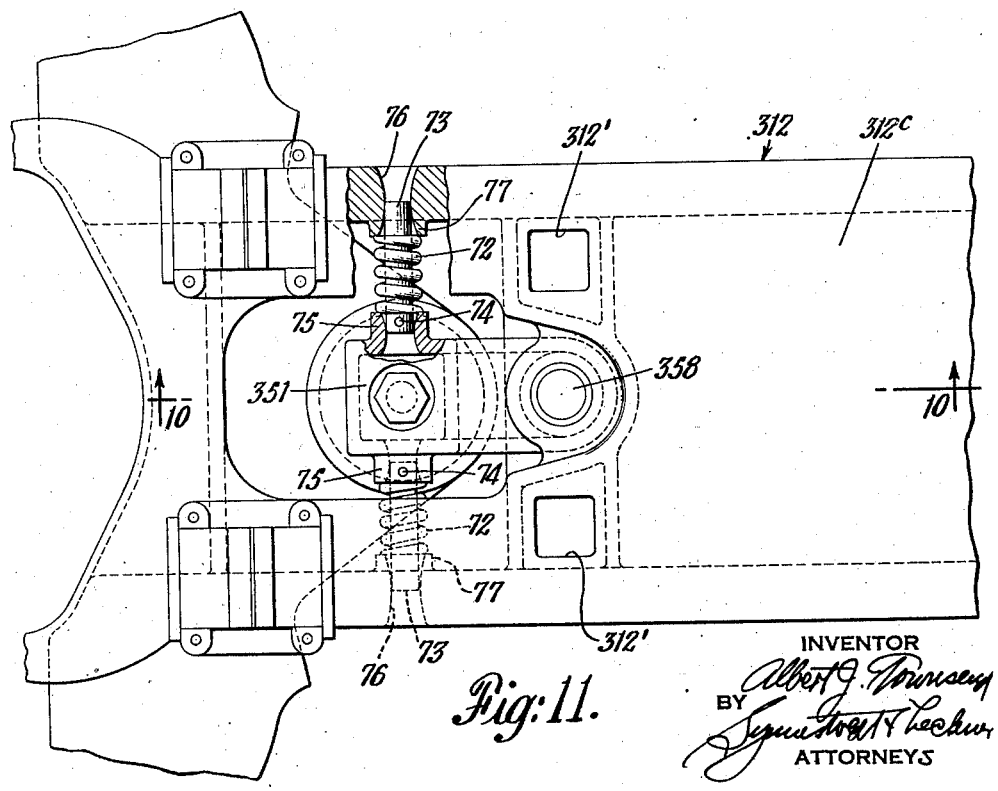
INVENTOR
Albert J. Townsend
BY
ATTORNEYS Patented Dec. 23, 1947

2,433,308

UNITED STATES PATENT OFFICE 2,433,308

LOCOMOTIVE TRUCK PIVOT MECHANISM

Albert J. Townsend, Lima, Ohio

Application August 12, 1943, Serial No. 498,351

15 Claims. (Cl. 105—174)

This invention relates to locomotive truck pivot mechanism and particularly to certain features of such mechanism in their cooperative relation to a superimposed frame such as the main framing of the locomotive. The invention is of especial advantage in association with radial trucks, particularly of the multiple-axle trailing type, and the invention will be herein illustrated and described in such association, though it is not in its broader aspects limited thereto.

In various locomotive designs, such as those involving trucks of the characteristics above mentioned, it is necessary or desirable that lateral motion be provided at the region of the pivot, between the truck frame and the frame supported thereon. This is especially true in the case of locomotives employing a radial trailer truck having two or more axles. In such an arrangement, if a fixed pivot is used, the angling of the truck toward one side or the other about the fixed pivot point (as when the locomotive enters a curve) gives only an approximation of the correct alignment of the truck with the track curvature. The resulting flange wear, in a two-axle truck, is particularly bad on the first pair of wheels, i. e., those nearest to the driving wheelbase; and in the case of a truck with three or more axles, the flanges of the intermediate wheels may be subjected to similarly severe wear. The tracking action of such locomotives is correspondingly impaired, and they are more subject to the possibility of derailment than they would be if lateral motion were permitted at the truck pivot.

I have heretofore evolved certain arrangements to provide lateral motion at such a truck pivot, subject to the yielding but progressive restraint of the imposed load. Such arrangements are shown in my prior patents numbered 2,173,867 and 2,197,137.

It is an object of the present invention to overcome the disadvantages of the prior art such as those which are inherent in the fixed-pivot constructions above mentioned, while providing the advantages of lateral motion at the pivot as shown in my said patents, and at the same time securing further advantages, both structural and functional.

In general, the present invention contemplates a novel and advantageous utilization of available space within the confines of the locomotive framing for the housing and/or mounting of the major portion of the truck pivot structure and/or of the lateral-motion assembly therefor.

Still further, the invention contemplates such an arrangement wherein a portion of the main framing which is of substantial strength, and/or of greater vertical depth than the cooperating pivot end of the truck frame, is employed to house the major part of the mechanism.

Still further, the invention contemplates the construction and arrangement of the mechanism, so housed, in a way to transmit weight from said portion of the main frame to the truck frame adjacent the pivot center, and desirably through the pivot itself, while maintaining the pivot portion of the truck frame in a simple and rugged form.

More specifically, the present invention contemplates a lateral-motion truck pivot mechanism, of the character described, wherein either a spring resistance or a weight resistance is imposed upon the lateral motion mounting by means reacting against and/or housed within a portion of the main frame.

One embodiment of the invention comprehends the accomplishment of the foregoing objects by a mechanism wherein a centering type of lateral motion device is provided by means of rollers and cams, or the equivalent.

Another embodiment comprehends the accomplishment of the foregoing objects by a mechanism wherein the lateral motion at the pivot is provided by a lever which carries that portion of the pivot which is associated with the main frame, said lever being in turn pivoted in the main frame for generally transverse swinging.

The invention further contemplates such a pivoted lever arrangement, wherein the pivotal mounting of the lever is on an axis slightly inclined from the vertical but preferably lying in the longitudinal plane of symmetry of the frame, so that lateral swinging of said lever is accompanied by depression of the pivot center, which produces a weight-imposed restoring or centering action. This involves an arcuate or rolling motion of the truck pivot center, which is accommodated by a spherical seat between the pivot member associated with the main frame and the pivot member associated with the truck frame. Said spherical seat also accommodates the relative motions between the truck frame and the main frame due to the movements of the truck, not only laterally, but also vertically, the latter motion being a result of the action of the rockers which are normally arranged at the two rear corners of such trucks.

In addition to the foregoing, the invention contemplates the imposition of a centering effect by means of springs, if desired, which are preferably disposed to act between a fixed part of the main frame and a lever or arm pivoted on the main frame and carrying one member of the truck pivot assembly.

The invention further contemplates the provision of a partial frame unit which carries and/or houses the lateral motion truck pivot mechanism and is in turn adapted to be secured to the main portion of the main frame, as by being bolted thereto.

Still further, the invention contemplates locomotive main framing, desirably in the form of a locomotive bed casting, having integrally formed therein the housing and/or mounting for the lateral motion pivot mechanism of the truck. In the case of the roller type of mechanism above mentioned, such integral construction preferably includes an inverted pocket or recess to receive the moving parts, and/or transverse and longitudinal positioning means for such parts; and in the case of the pivoted lever arrangements above mentioned, the invention contemplates an integral hinge or bracket for the lever pivot, desirably configured with a plurality of apertured lugs or tongues, positioned to interdigitate with complementary tongues on the lever.

How the foregoing objects and advantages, together with such others as are incident to the invention, are secured, will now appear from the following description, taken together with the accompanying drawings.

Figure 1 is a side elevational view showing a 3-axial radial trailer truck associated with the main frame of a steam locomotive having a plurality of driving axles which latter constitute the rigid wheelbase; this figure illustrating an embodiment of the invention wherein a roller type of lateral-motion mounting is housed within the main frame which in this case is formed as a locomotive bed casting;

Figure 2 is a partial plan view of the arrangement of Figure 1, omitting wheels and spring rigging;

Figure 3 is a transverse section taken on the line 3—3 of Figure 1, illustrating details of the pivot assembly and lateral-motion arrangement which is housed within the main frame casting;

Figure 4 is a section taken in the longitudinal vertical plane, on the line 4—4 of Figure 2;

Figure 5 is a fragmentary side elevational view, taken in the region of the truck pivot mechanism, showing a modified embodiment of the invention; wherein the lateral-motion mounting is housed within a removable frame member such as a cradle, which in turn is bolted into the rear end portion of the main frame;

Figure 6 is a fragmentary plan view of the mechanism of Figure 5;

Figure 7 is a transverse section taken on the line 7—7 of Figure 5;

Figure 8:
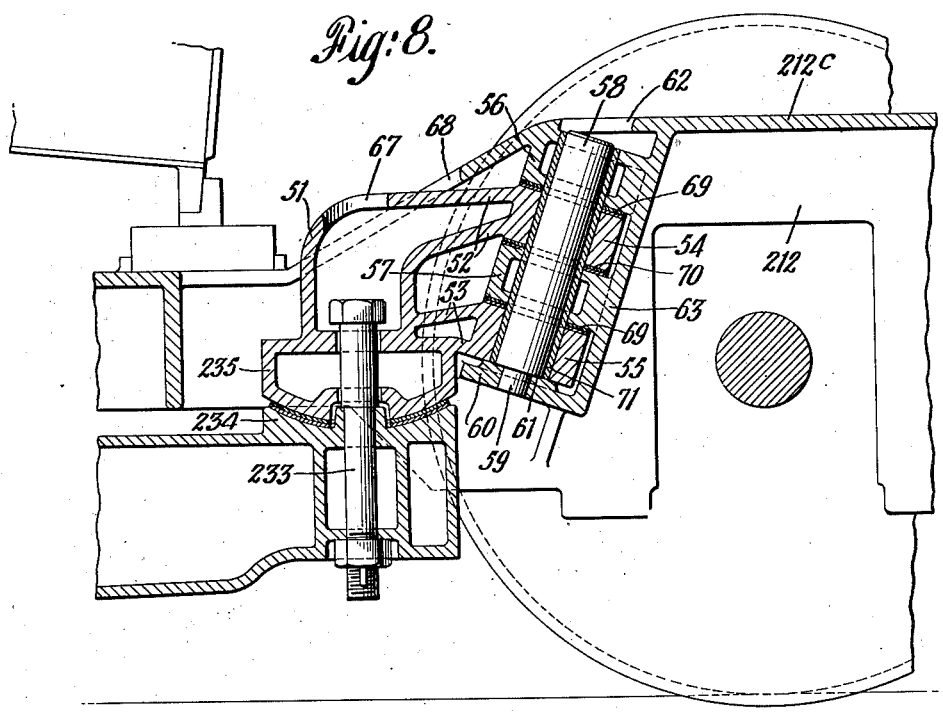
Figure 8 is a fragmentary, vertical, longitudinal sectional view, taken in the region of the truck pivot mechanism, showing a modified embodiment of the invention, wherein the upper member of the pivot assembly is carried by a laterally swinging arm which in turn has a pivot, angled obliquely in the fore-and-aft plane; this view being taken on the line 8—8 of Figure 9.

Figure 10 is a fragmentary, vertical, longitudinal sectional view, taken in the region of the truck pivot mechanism, showing a modified embodiment of the invention, wherein the upper member of the pivot assembly is carried by a laterally swinging arm which is mounted by an upright pivot in the main frame, and is centered by springs housed within and reacting against said frame; this view being taken on the line 10—10 of Figure 11; and Figure 11 is a fragmentary plan view of the mechanism of Figure 10.

Referring first to Figures 1 to 4, it will be observed that I have fragmentarily illustrated a locomotive bed casting 12, which not only serves to journal the axles 13 of the driving wheels 14 (only one of which is shown) but also extends rearwardly from the main wheelbase to the region beneath the firebox 15 to serve as a support therefor, and in that region it is in turn supported by a radial trailer truck comprising a truck frame 16, three axles 17, and pairs of wheels 18, 18 and 19.

At the front edge of the firebox, the main frame is provided with pads 20 for supporting the longitudinally-sliding shoes 21 which are fixedly secured to depending lugs 22 beneath the mud ring of the firebox. Adjacent the rear end, another sliding support is indicated generally by the reference numeral 23. Beneath the firebox, the main frame casting is formed essentially of two side beams 12a, 12a (as seen in Fig. 2) having a large opening between them, to accommodate ashpan means such as indicated at 24 in Figure 1. At the rear, the frame has a cross beam 25 which receives support from the truck frame through the intermediation of the usual rockers 26.

The truck wheels are preferably equalized with the driving wheels by means of spring rigging, comprising driver springs 27, truck springs 28, and the usual links and equalizers, including, at each side of the truck, a main equalizer beam 29 pivotally mounted in the truck frame at 30 and connecting the driver and truck springs. Apertures 12' are formed in the main frame structure, to pass the equalizer hangers.

Toward the front end of the truck, the side members of its frame 16 extend downwardly to pass beneath the main frame, and converge to form an apex or pivot portion 31. This part of the truck frame (as seen in greater detail in the sectional Figures 3 and 4) is formed with upper and lower walls 31a and 31b joining the main peripheral wall, and being further strengthened at this region by an internally disposed cylindrical structure 32 which also receives the centrally disposed pivot assembly pin 33.

The truck pivot is formed of complementary members 34 and 35 having cooperating spherical bearing surfaces, between which may be interposed suitable liners, such as dished bronze disks, as shown. The pivot member 34 is formed on the upper surface of the reinforced front end of the truck frame, and has a centrally disposed circular positioning rib 36, located (with suitable clearance) within the corresponding flange or cup 37 of the upper bearing member 35.

The upper bearing member 35 is preferably formed integral with a cross member 38 which takes the form of a lateral-motion bolster. In the longitudinal direction of the truck (as seen in Fig. 4) this bolster 38 is positioned (with slight clearance) by means of the wear plates 39 welded to the opposed faces of the transverse webs 40 of the main frame structure. As seen in Figure 3, these cross webs 40 of the main frame extend transversely between the side frame elements 12b of the main frame. Lateral motion of the member 38 is limited by the integral abutments 41 formed on the inner faces of said side members of the main frame.

Above the bolster 38, the main frame has a deck plate or cross web 12c, which completes the inverted pocket within which the lateral-motion assembly is housed. The deck 12c is carried at a higher level forwardly of the cross-member 40a, as seen in Figure 4. The structure 12c, adjacent the pivot assembly, carries depending flanges 42 which serve to position a plate 43 through which the weight is transmitted to the bolster 38 by the intermediation of rollers 44 cooperating with the inclined surfaces 45 and 46 formed on the plates 38 and 43. The lateral motion of the bolster is accommodated, at the pivot assembly pin 33, by means of the slotted opening 47 which extends through the deck plate 12c and the plate 43.

In the arrangement shown in Figures 5, 6 and 7, the lateral motion mechanism and upper pivot member are housed within a separate frame casting 112, which may have rearwardly extending side beams 112a extending back beneath the firebox (not shown) to form a cradle structure, and the casting 112 may be machined off at the side faces 48, to fit between complementary side members M of a main frame structure to which it may be bolted, bolts 49 being provided for this purpose. When so positioned, the top web 112c of the casting forms a part of the rigid transverse bracing structure for the rear end of the main frame members. The casting is also provided with suitable apertured lugs 50 for mounting parts of the foundation brake rigging.

Other features of the arrangement of Figures 5 to 7, such as the truck frame, the pivot assembly, and the lateral motion mechanism, are essentially similar to those described with reference to Figures 1 to 4, and need not be again described here.

Figure 9:
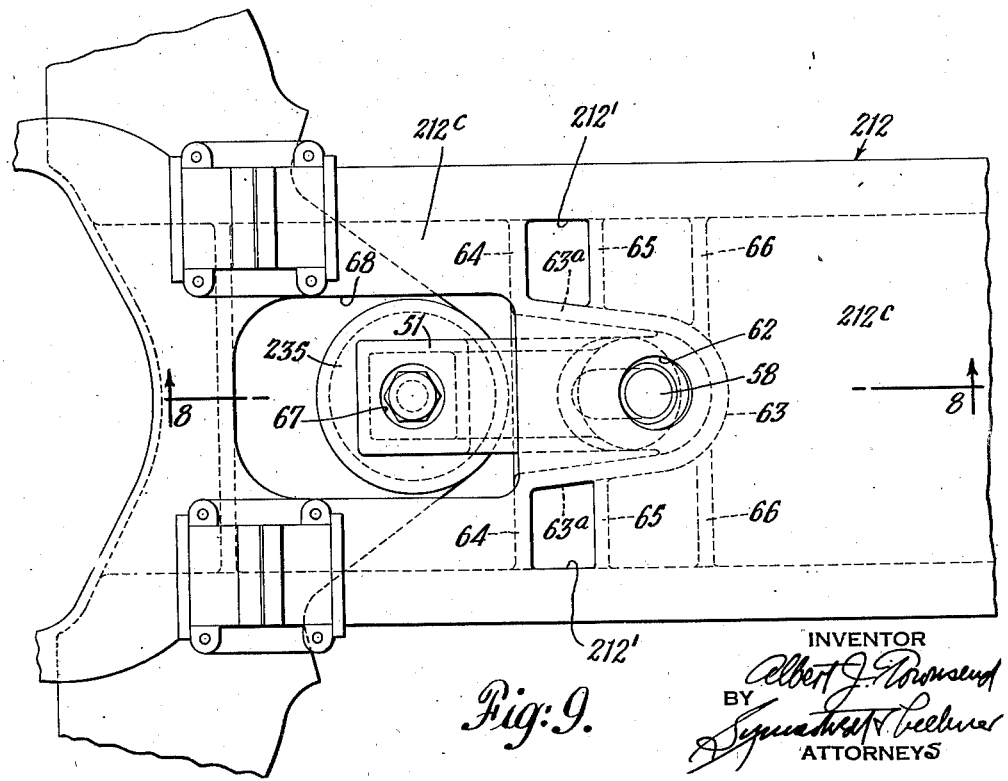
Figure 9 is a fragmentary plan view of the mechanism of Figure 8.

In the arrangement shown in Figures 8 and 9, provision is made for a weight-restrained lateral motion of the truck pivot by locating the upper pivot member 235 at the bottom of the free end of a lever or arm 51 which is mounted to swing laterally about a generally upright pivot axis which however has an inclination in the fore-and-aft direction, such that lateral swinging of said arm depresses the truck pivot. Said arm is of yoke-like form, being configured with two branches 52, 53, which carry apertured lugs 54, 55, interfitting with similar apertured lugs 56, 57, formed integrally with the main frame or bed casting 212.

The hinging of the lugs is accomplished by a heavy pin 58, which at the bottom has a reduced end 59 which fits into an aperture in the web 60 and leaves a shoulder 61 to bear against the upper face of said web so as to prevent dropping out of the pin. For purposes of assembly and removal, an aperture 62 is provided in the upper deck 212c of the main framing, in a position to pass the pin 58.

The fixed hinge lugs 56 and 57 are formed within the frame structure, just inside the upstanding curved wall 63. As seen in Figure 9, this wall extends at each side in a rearward direction, the two wall portions 63a diverging to accommodate the lateral swinging of the lever 51 about the pivot 58. The pocket thus formed is braced by transverse webs such as indicated at 64, 65, and 66.

The arm 51 is of hollow formation, being adapted to receive the pivot assembly pin 233, and for purposes of assembly and removal the top wall of the arm is provided with an aperture 67 adapted to pass said pin. The upper wall 212c of the main frame is in turn provided with an enlarged, approximately oblong opening 68, adapted for insertion and removal of the arm 51 together with its integral spherical pivot member 235. It may also have openings 212', one at each side of the arm and its pivot, for passage of spring rigging.

In normal operation, the weight transmitted to the front end of the truck is carried through the oblique hinge, the arm 51, and the pivot assembly 235, 234; and the spherical seat between the members 234 and 235 (having liners, if desired, as in the previously-described embodiments) accommodates not only the swinging and rocking movements of the truck frame, but also the swinging of the arm 51, and the rocking thereof which results from the obliquity of its pivot axis. Steel and/or bronze thrust washers are provided at the oblique pivot, as indicated at 69, 69, and 70. For a similar purpose there is a bushing 71 surrounding the pivot pin 58.

Since the tendency of the truck to displace the pivot center laterally on a curve will swing the arm 51 to one side or the other, and since this (due to the oblique pivot 58) results in lowering the truck pivot assembly, thus bearing down harder on the truck frame, an automatic centering or restoring action is secured, by virtue of the imposed load. The degree of inclination of the pivot 58 from the vertical will be so chosen as to give the desired magnitude of truck pivot centering action.

In the embodiment shown in Figures 10 and 11, the arm 351 is mounted by a vertical pivot pin 358 (instead of employing an oblique axis) and the lateral resistance to truck pivot movement is secured by a pair of springs 72 which are carried on supporting rods 73 which are secured by vertical pins 74 in hollow bosses 75 formed on the sides of the arm 351. The rods 73 slide loosely in the openings 76, upon lateral swinging of the arm 351. The springs 72 react between the bosses 75 on the lever and the bosses 77 on the frame 312. As in other embodiments, the deck 312c may be apertured at 312' to pass spring rigging.

In conclusion, it will be seen that although the invention involves the advantages associated with lateral motion at the trailer truck pivot, yet the truck itself is extremely simple, being relieved of most of the moving and wearing parts of the pivot assembly, which instead are housed in the main frame where there is more room and greater depth and strength.

In all embodiments there is an automatic centering action, and the parts for effecting this are also carried in the main frame.

The heavy, yoked-arm arrangements of Figures 8-9 and 10-11 provide exceptional simplicity, ruggedness and reliability; and the obliquely-pivoted arm of Figures 8 and 9 has the further advantage of unusual stability in operation.

I claim:

1. In a locomotive having a frame in which driving wheel axles are journalled, and an associated truck with a frame in which a plurality of truck axles are journalled, a truck pivot assembly constituting the draft connection to the truck frame and comprising a pivot member associated with said truck frame in a position to provide a pivot axis longitudinally offset from the truck center about which axis the truck may have pivotal motion, and a weight-transmitting lateral-motion mounting operatively interposed between the first-mentioned frame and said pivot assembly whereby weight from said first-mentioned frame is transmitted to the truck through said assembly.

2. In a locomotive having a frame in which driving wheel axles are journalled, and an associated truck with a frame in which a plurality of truck axles are journalled, a pivot constituting the draft connection to the truck frame and providing a pivot axis longitudinally offset from the truck center about which axis the truck may have pivotal motion and through which the truck may receive weight from the frame first-mentioned and a weight-transmitting lateral-motion mounting for said pivot largely housed within the frame first mentioned.

3. In a locomotive having a frame in which driving wheel axles are journalled, and an associated radial truck with a frame in which a plurality of truck axles are journalled, a weight-transmitting pivot assembly bearing upon said truck frame about which the truck may have radial motion, and a lateral-motion mounting operatively interposed between the frame first mentioned and the said pivot assembly.

4. In a locomotive having a frame in which driving wheel axles are journalled, and an associated radial truck with a frame in which a plurality of truck axles are journalled, a weight-transmitting pivot assembly bearing upon said truck frame about which the truck may have radial motion, and a weight-transmitting lateral-motion mounting operatively interposed between the frame first mentioned and the said pivot assembly.

5. In a locomotive having a main frame structure in which driving wheel axles are journalled, and a truck with a frame in which at least two truck axles are journalled, supplemental framing formed as a unit separate from the main frame structure and housing a pivot assembly for the truck and having means of attachment to and detachment from the main frame structure.

6. A locomotive bed casting formed with an integral hinge knuckle disposed at an angle oblique to the vertical and shaped to accommodate a truck-pivoting arm.

7. In a locomotive having a frame in which driving wheel axles are journalled, and an associated truck with a frame in which at least two truck axles are journalled, a pivot assembly between said frames, operatively interconnecting them and comprising a laterally-swingable arm pivotally mounted in the frame first mentioned and subject to weight therefrom, and a weight-transmitting ball mounting for said arm on the truck frame.

8. In a locomotive having a frame in which driving wheel axles are journalled, and an associated truck with a frame in which at least two truck axles are journalled, a pivot assembly between said frames, operatively interconnecting them and comprising a laterally-swingable arm pivotally mounted in the frame first mentioned and subject to weight therefrom, a weight-transmitting ball mounting for said arm on the truck frame, and means opposing the lateral swinging of said arm relative to said first-mentioned frame.

9. In a locomotive having a frame in which driving wheel axles are journalled, and an associated truck with a frame in which at least two truck axles are journalled, a pivot assembly between said frames, operatively interconnecting them and comprising a laterally-swingable arm pivotally mounted in the frame first mentioned and subject to weight therefrom, a weight-transmitting ball mounting for said arm on the truck frame, and means opposing the lateral swinging of said arm relative to said first-mentioned frame, including spring means housed in said frame.

10. In a locomotive having a frame in which driving wheel axles are journalled, and an associated truck with a frame in which at least two truck axles are journalled, a pivot assembly between said frames, operatively interconnecting them and comprising a laterally-swingable arm pivotally mounted in the frame first mentioned, and a ball mounting for said arm on the truck frame, the pivot for said arm comprising a pivot axis obliquely inclined with respect to the vertical.

11. In a locomotive having a frame in which driving wheel axles are journalled, and an associated truck with a frame in which at least two truck axles are journalled, a pivot assembly between said frames, operatively interconnecting them and comprising a laterally-swingable arm pivotally mounted in the frame first mentioned, and a ball mounting for said arm on the truck frame, the pivot for said arm comprising a pivot axis obliquely inclined with respect to the vertical in a fore-and-aft plane.

12. In a railway vehicle having two frames mounted on separate groups of wheels, one of said frames being laterally swingable relative to the other, a pivot assembly operatively interconnecting said frames and comprising a connecting arm, a pivotal connection between said arm and one of said frames, and a pivotal connection between said arm and the other of said frames, the last mentioned pivotal connection being formed to provide a pivot axis oblique to the vertical.

13. A construction according to claim 12, wherein the first mentioned pivotal connection is formed to provide for universal motion.

14. A construction according to claim 12, wherein the oblique pivot axis lies in a vertical plane extending longitudinally of the vehicle.

15. A construction according to claim 12, wherein both pivotal connections are constructed for the transmission of weight from one of said frames to the other.

ALBERT J. TOWNSEND.

REFERENCES CITED

The following references are of record in the file of this patent:

UNITED STATES PATENTS

| Number | Name | Date |
|---|---|---|
| 266,685 | Forney | Oct. 31, 1882 |
| 1,663,227 | Woodard | Mar. 20, 1928 |
| 1,482,190 | Hohenstein | Jan. 29, 1924 |
| 2,349,568 | Travilla | May 23, 1944 |
| 372,608 | English | Nov. 1, 1887 |
| 708,523 | Burger | Sept. 9, 1902 |
| 1,935,335 | Scudder | Nov. 14, 1933 |

FOREIGN PATENTS

| Number | Country | Date |
|---|---|---|
| 155,038 | Great Britain | Dec. 16, 1920 |